(12) United States Patent  (10) Patent No.: US 8,634,138 B2
Umezu  (45) Date of Patent: Jan. 21, 2014

(54) LENS BARREL AND OPTICAL APPARATUS INCLUDING THE SAME

(75) Inventor: Takuji Umezu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 13/219,914

(22) Filed: Aug. 29, 2011

(65) Prior Publication Data

US 2012/0050866 A1 Mar. 1, 2012

(30) Foreign Application Priority Data

Aug. 31, 2010 (JP) ................... 2010-193706

(51) Int. Cl.
  *G02B 27/64* (2006.01)
(52) U.S. Cl.
  CPC .................... *G02B 27/646* (2013.01)
  USPC ........................................ 359/557
(58) Field of Classification Search
  None
  See application file for complete search history.

(56) References Cited

U.S. PATENT DOCUMENTS

| 6,112,028 A * | 8/2000 | Okada ............................ 396/55 |
| 7,440,028 B2 * | 10/2008 | Takeda ......................... 348/375 |
| 7,949,243 B2 * | 5/2011 | Suzuki ............................ 396/55 |
| 2009/0091831 A1 * | 4/2009 | Ozaki et al. ................... 359/557 |

FOREIGN PATENT DOCUMENTS

| CN | 101587226 A | 11/2009 |
| JP | H06-324252 A | 11/1994 |
| JP | 11-337797 A | 12/1999 |
| JP | 2003-307667 A | 10/2003 |

* cited by examiner

*Primary Examiner* — Derek S Chapel
(74) *Attorney, Agent, or Firm* — Canon USA Inc IP Division (57) ABSTRACT

A lens barrel includes first and second driving units configured to move first and second moving frames in an optical axis direction, and two correction driving sources configured to move the second moving frame in a direction perpendicular to an optical axis. Moving ranges in the optical axis direction of the first and second moving frames overlap with each other. The first and second moving frames are connected to a fixing portion of a fixed barrel by first and second flexible printed boards. One of the first and second driving units is located on a side of the optical axis opposite one of the second correction driving sources, and U-turn portions of the first and second flexible printed boards are located on a side of the optical axis opposite the other correction driving source, when viewed in the optical axis direction.

3 Claims, 10 Drawing Sheets

LENS BARREL AND OPTICAL APPARATUS INCLUDING THE SAME

BACKGROUND OF THE INVENTION

1. Field of the Invention

The present invention relates to a lens barrel and an optical apparatus including the lens barrel, and more particularly, to an optical apparatus, such as a digital still camera or a video camera, which includes an interchangeable lens or which is combined with a lens barrel.

2. Description of the Related Art

In optical apparatuses and interchangeable lenses of the related art, a lens moving frame is moved in the optical axis direction by an actuator such as a voice coil motor or a stepper motor. In most lens barrels including a zoom lens, first and second moving frames for a variator lens unit and a focus lens unit are movable in the optical axis direction. Japanese Patent Laid-Open No. 6-324252 discloses a lens barrel in which a first lens moving frame and a second lens moving frame, of a plurality of lens moving frames, are adjacent to each other in the optical path and are both movable in the optical axis direction for zooming or focusing.

In the zoom lens barrel of the above publication, the first and second lens moving frames are held by guide bars in a manner such as to be movable in the optical axis direction. In this case, the first lens moving frame shares a sleeve bar with a front lens moving frame.

In most lens barrels including a zoom lens, zooming and focusing are performed by moving a first lens moving frame and a second lens moving frame in the optical axis direction. In another type of lens barrel, one lens moving frame is moved in a direction perpendicular to the optical axis in order to correct a motion blur caused when the zoom lens vibrates (a hand shake occurs).

Such a lens barrel stores two driving units for driving the first and second lens moving frames and two motion-blur correction driving sources for driving one lens moving frame in the yaw direction and pitch direction, of the directions perpendicular to the optical axis. The lens barrel also stores a flexible printed wiring board (flexible printed board) that electrically connects the two driving units and the two motion-blur correction driving sources to a control unit.

The lens barrel that stores these members tends to have a large size and a complicated structure. For example, the length of the lens barrel in the optical axis direction can be decreased by causing a moving range on the optical axis of the first lens moving frame to overlap with that of the second lens moving frame. That is, by increasing the amount of movement of the first lens moving frame toward the second lens moving frame and the amount of movement of the second lens moving frame toward the first lens moving frame, the use efficiency of the space in the lens barrel can be enhanced, and the length of the lens barrel can be shortened. However, when the above-described components are stored in the lens barrel, the lens barrel is enlarged and complicated.

SUMMARY OF THE INVENTION

The present invention provides a small lens barrel having a reduced length in the optical axis direction, and an optical apparatus including the lens barrel.

A lens barrel according to an aspect of the present invention includes a first moving frame configured to move along a first guide bar in an optical axis direction while supporting a first lens; a second moving frame configured to move along a second guide bar in the optical axis direction while supporting a second lens and to move in a direction perpendicular to an optical axis so as to correct a motion blur, the second lens being provided adjacent to the first lens and supported by a fixed barrel; a first driving unit configured to move the first moving frame in the optical axis direction; a second driving unit configured to move the second moving frame in the optical axis direction; and two correction driving sources configured to move the second driving unit in a direction perpendicular to the optical axis. The first moving frame and the second moving frame move independently. Moving ranges in the optical axis direction of the first moving frame and the second moving frame overlap with each other. The first moving frame is connected to a fixing portion of the fixed barrel by a first flexible printed board, and the second moving frame is connected to the fixing portion of the fixed barrel by a second flexible printed board. One of the first driving unit and the second driving unit is located on a side of the optical axis opposite one of the two correction driving sources when viewed in the optical axis direction. A U-turn portion of the first flexible printed board and a U-turn portion of the second flexible printed board are located on a side of the optical axis opposite the other correction driving source when viewed in the optical axis direction.

In the lens barrel, a smaller angle of an angle formed by a line connecting the optical axis and a center of the first guide bar and an angle formed by a line connecting the optical axis and a center of the second guide bar may be at least 60 degrees or more, when viewed in the optical axis direction.

An optical apparatus according to another aspect of the present invention includes the lens barrel.

According to the aspects of the present invention, it is possible to obtain a small lens barrel having a reduced length in the optical axis direction.

Further features of the present invention will become apparent from the following description of exemplary embodiments with reference to the attached drawings.

DESCRIPTION OF THE EMBODIMENTS

A preferred embodiment will be described in detail below with reference to FIGS. 1-10.

Generally, a lens barrel of the embodiment includes a first moving frame (focus moving frame) 4 and a second moving frame (shift holding frame) 313. The first moving frame 4 is movable in the optical axis direction along guide bars 10a and 10b while supporting or restraining (i.e., holding) a first lens (optical element) L4. The second moving frame 313 is adjacent to the first lens L4, and is movable in the optical axis direction along guide bars 9a and 9b while supporting or holding a second lens (optical element) L3. The second moving frame 313 is supported by a fixed barrel 6, and moves in two directions orthogonal to the optical axis in order to correct a motion blur (i.e., an unclear or unfocused image). The lens barrel also includes a first driving unit (voice coil motor) 4V, a second driving unit (stepper motor) 301, and two correction driving sources (actuators 3Y and 3P). The first driving unit 4V moves the first moving frame 4 in the optical axis direction, and the second driving unit 301 moves the second moving frame 313 in the optical axis direction. The two correction driving sources 3Y and 3P move the second moving frame 313 in the directions perpendicular to the optical axis.

The guide bars for guiding the first moving frame 4 and the guide bars for guiding the second moving frame 313 can move independently and independent of each other. The moving ranges in the optical axis direction of the first and second moving frames 4 and 313 overlap with each other. The first moving frame is connected to a fixing portion of the fixed barrel 6 (focus-flexible-printed-board retaining portions 601) by a first flexible printed board (focus flexible printed board) 406, and the second moving frame is connected to the fixing portion of the fixed barrel 6 by a second flexible printed board (shift flexible printed board) 308. One of the first driving unit and the second driving unit, that is, the voice coil motor 4V is located on a side (opposite side) of an optical axis LX opposite one of the two correction driving sources 3Y and 3P, that is, the correction driving source 3P, when viewed in the optical axis direction.

A U-turn portion 406a of the first flexible printed board and a U-turn portion 308a of the second flexible printed board are both located on a side of the optical axis LX opposite the other correction driving source 3Y when viewed in the optical axis direction. Here, the phrase "an object point A is located on a side of the optical axis opposite an object point B when viewed in the optical axis direction" means that the object point A and the object point B are located on opposite sides of a plane having a normal AO extending downward from the object point A in a direction orthogonal to the optical axis LX.

In the lens barrel of the embodiment, the guide bar (10a, 10b) A for the first moving frame and the guide bar (9a, 9b) B for the second moving frame are arranged as follows, when the lens unit is viewed in the optical axis direction. That is, a smaller angle of an angle formed by a line connecting the optical axis LX and the center of the guide bar A and an angle formed by a line connecting the optical axis LX and the center of the guide bar B is within the range of about 60 to about 180 degrees.

Figure 1:
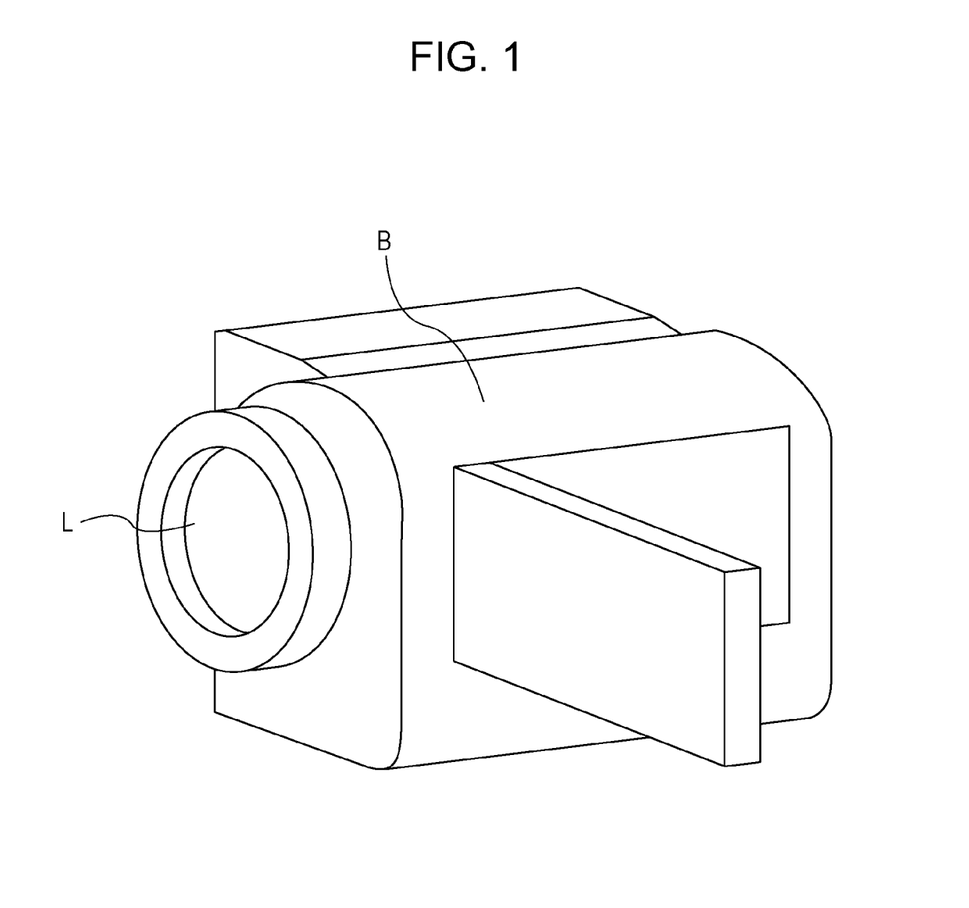
FIG. 1 is a perspective view of a camera serving as an optical apparatus according to an embodiment of the present invention.

FIG. 1 schematically illustrates the configuration of an optical apparatus, such as a video camera or a digital camera, according to an embodiment of the present invention (hereinafter referred to as a camera). The camera includes a lens barrel L capable of zooming, and a camera body B. The camera body B stores a silver-halide film or an image pickup element that records an object image formed by an imaging optical system provided in the lens barrel L.

The structure of the lens barrel L in the embodiment of the present invention will be described with reference to FIGS. 2 and 3. The directions of arrows X and −X coincide with the optical axis direction. An imaging optical system is formed by a zoom optical system (zoom lens system) including four lens units.

Figure 2:
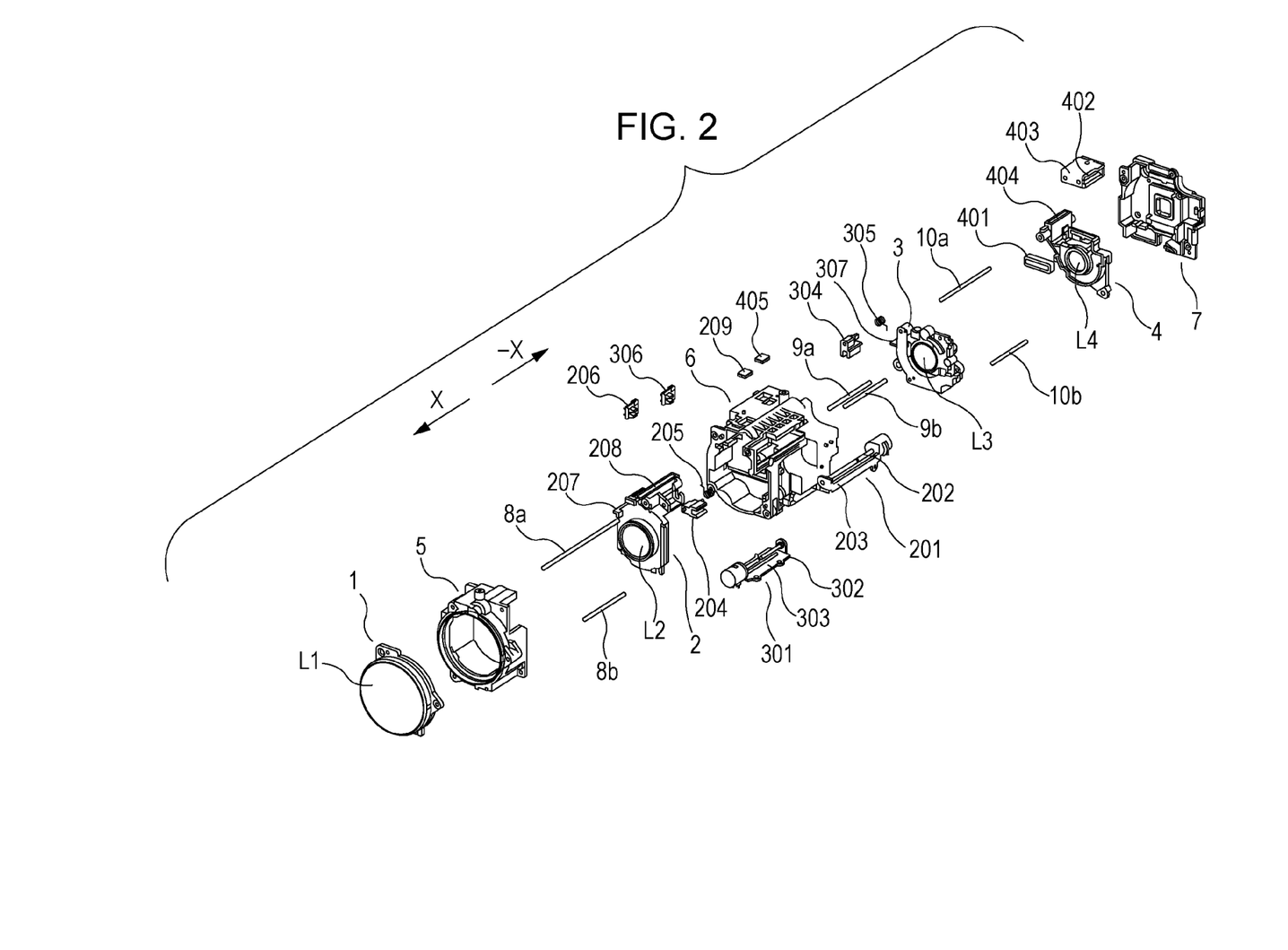
FIG. 2 is an exploded perspective view of a lens barrel provided in the camera of FIG. 1.
Figure 3:
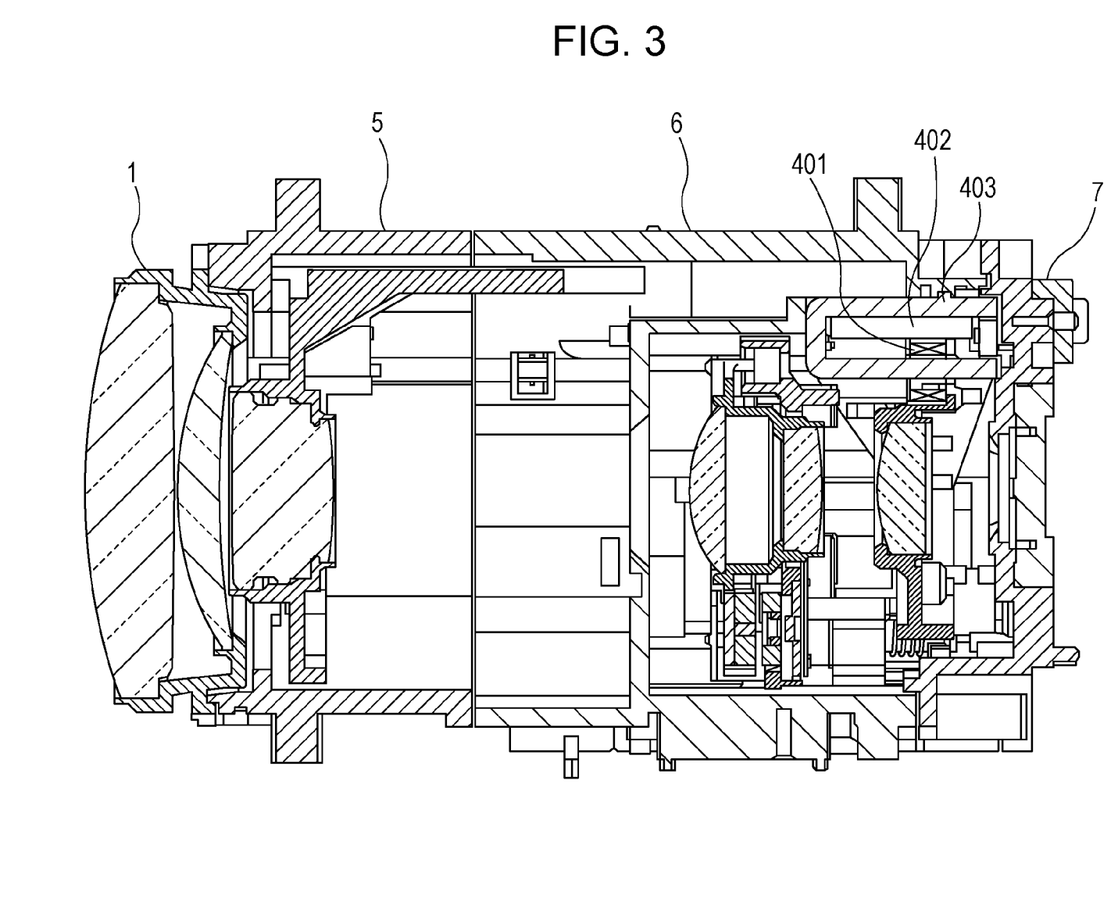
FIG. 3 is a cross-sectional view of the lens barrel of FIG. 2.

Referring to FIGS. 2 and 3, the zoom optical system includes a first lens unit L1, a second lens unit L2, a third lens unit L3, and a fourth lens unit L4. The second lens unit L2 moves in the optical axis direction for zooming. The third lens unit L3 shifts in a direction orthogonal to the optical axis of the imaging optical system (hereinafter referred to as an optical-axis orthogonal direction) so as to reduce a motion blur, and moves in the optical axis direction for zooming. The fourth lens unit L4 moves in the optical axis direction for zooming and focusing. The first lens unit L1 is held or supported by a first lens frame 1, and the second lens unit L2 is held or supported by a variator moving frame 2.

The third lens unit L3 is held or supported by a shift unit (shift moving frame) 3, and the fourth lens unit L4 is held or supported by a focus moving frame 4. A fixed barrel 5 is coupled at a rear end to a rear barrel 6 and fixed at a front end to the first lens frame 1 so as to fix the first lens unit L1 at a predetermined position. A CCD holder 7 holds an unillustrated image pickup element (photoelectric conversion element) such as a CCD sensor or a CMOS sensor, and is fixed to the rear barrel 6.

First and second guide bars 8a and 8b are held or supported at both ends by the fixed barrel 5 and the rear barrel 6. Third and fourth guide bars 9a and 9b and fifth and sixth guide bars 10a and 10b are held or supported at both ends by the rear barrel 6 and the CCD holder 7. The variator moving frame 2 is supported movably in the optical axis direction by the first and second guide bars 8a and 8b. The shift unit 3 is supported on the fixed barrel 5 movably in the optical axis direction by the third and fourth guide bars 9a and 9b.

A light-quantity adjusting unit (not illustrated) for changing the quantity of light incident on the imaging optical system is also fixed to the rear barrel 6. The light-quantity adjusting unit changes the aperture diameter by moving two or more aperture blades in the optical-axis orthogonal direction. In the light-quantity adjusting unit, a gradation ND filter (not illustrate) is movable into and out of the optical axis independently of the aperture blades. The focus moving frame 4 is supported so as to be movable in the optical axis direction by the fifth and sixth guide bars 10a and 10b.

Next, the structure of a driving unit for moving the variator moving frame 2 (second lens unit L2) will be described. A stepper motor 201 drives the variator moving frame 2 in the optical axis direction, and has a lead screw 202 on an output shaft thereof. This stepper motor 201 is fixed to the rear barrel 6 with a support member 203 being disposed therebetween. The lead screw 202 is meshed with a rack 204 attached to the variator moving frame 2. When the lead screw 202 is rotated by the application of current to the stepper motor 201, the variator moving frame 2 is driven in the optical axis direction via the rack 204.

Mutual rattling of the rack 204 and the variator moving frame 2 in the optical axis direction is avoided by a biasing force of a torsion coil spring 205. A zoom reference position detector 206 detects a reference position of the variator moving frame 2, and is formed by a photointerrupter that detects switching between a light shielding state and a light transmitting state made by the movement in the optical axis direction of a light shielding portion 207 provided in the variator moving frame 2. The zoom reference position detector 206 is fixed to the rear barrel 6 with a board being disposed therebetween.

The variator moving frame 2 holds a sensor magnet 208 that is multi-pole-magnetized in the optical axis direction. An MR sensor 209 for reading changes of magnetic lines of force in response to the movement of the sensor magnet 208 is fixed to a position on the rear barrel 6 opposing the sensor magnet 208. By using a signal from the MR sensor 209, the moving amount of the variator moving frame 2, that is, the second lens unit L2 from a predetermined reference position can be detected.

Next, the structure of a driving unit (first driving unit) for moving the shift unit 3 (third lens unit L3) will be described. A stepper motor 301 drives the shift unit 3 in the optical direction, and has a lead screw 302 on an output shaft thereof. The stepper motor 301 is fixed to the rear barrel 6 with a support member 303 being disposed therebetween. The lead screw 302 is meshed with a rack 304 attached to the shift unit 3. For this reason, when the lead screw 302 is rotated by the application of current to the stepper motor 301, the shift unit 3 is driven in the optical axis direction via the rack 304.

Mutual rattling of the rack 304 and the shift unit 3 in the optical axis direction is avoided by biasing force of a torsion coil spring 305. A zoom reference position detector 306 detects a reference position of the shift unit 3, and is formed by a photointerrupter that detects switching between a light shielding state and a light transmitting state made in response to the movement in the optical axis direction of a light shielding portion 307 provided in the shift unit 3. The zoom reference position detector 306 is fixed to the rear barrel 6 with a board being disposed therebetween. Further, the zoom reference position detector 306 formed by the photointerrupter is set to detect switching between a light shielding state and a light transmitting state of the light shielding portion 307 when the light shielding portion 307 is within the moving range of the shift unit 3 and outside the moving range of the focus moving frame 4.

Next, the structure of a focus driving unit (second driving unit) for moving the focus moving frame 4 (fourth lens unit L4) will be described. A driving coil 401 and a driving magnet 402 form a focus motor (voice coil motor) for driving the fourth lens unit L4 in the optical axis direction, and a yoke member 403 closes (i.e., contains) magnetic flux. The driving coil 401 is attached to the focus moving frame 4. The driving magnet 402 is provided in the yoke member 403, and the yoke member 403 is attached to the CCD holder 7.

When current is applied through the driving coil 401, Lorentz force is produced by mutual repulsion between magnetic lines of force caused between the driving magnet 402 and the driving coil 401, and drives the fourth lens unit L4 together with the focus moving frame 4 in the optical axis direction. The focus moving frame 4 holds a sensor magnet 404 that is multi-pole-magnetized in the optical axis direction. An MR sensor 405 for reading changes of magnetic lines of force in response to the movement of the sensor magnet 404 is fixed to a position on the rear barrel 6 opposing the sensor magnet 404. The sensor magnet 404 and the MR sensor 405 constitute a relative-position detection sensor.

By using a signal from the MR sensor 405, the moving amount of the focus moving frame 4, that is, the fourth lens unit L4 from the predetermined position can be detected. A position where the focus moving frame 4 is moved toward the object side, that is, in the −X-direction parallel to the optical axis into contact with a mechanical end by the application of current through the coil is detected as a reference position.

As described above, in the focus driving unit (voice coil motor 401, 402, and 403), a Lorentz force is produced to drive the focus moving frame 4 in the optical axis direction in a state in which the driving coil 401 is energized (hereinafter referred to as an energized state). However, in a state in which the driving coil 401 is not energized (hereinafter referred to as an unenergized state), a driving force for the focus moving frame 4 is not produced, and the focus moving frame 4 itself does not have a self holding force. The self folding force refers to a force that can stop the movable driving coil 401 and the focus moving frame 4 having the driving coil 401 at a position in an unenergized state.

Next, driving methods for the second lens unit L2, the third lens unit L3, and the fourth lens unit L4 will be described with reference to FIG. 4.

Figure 4:
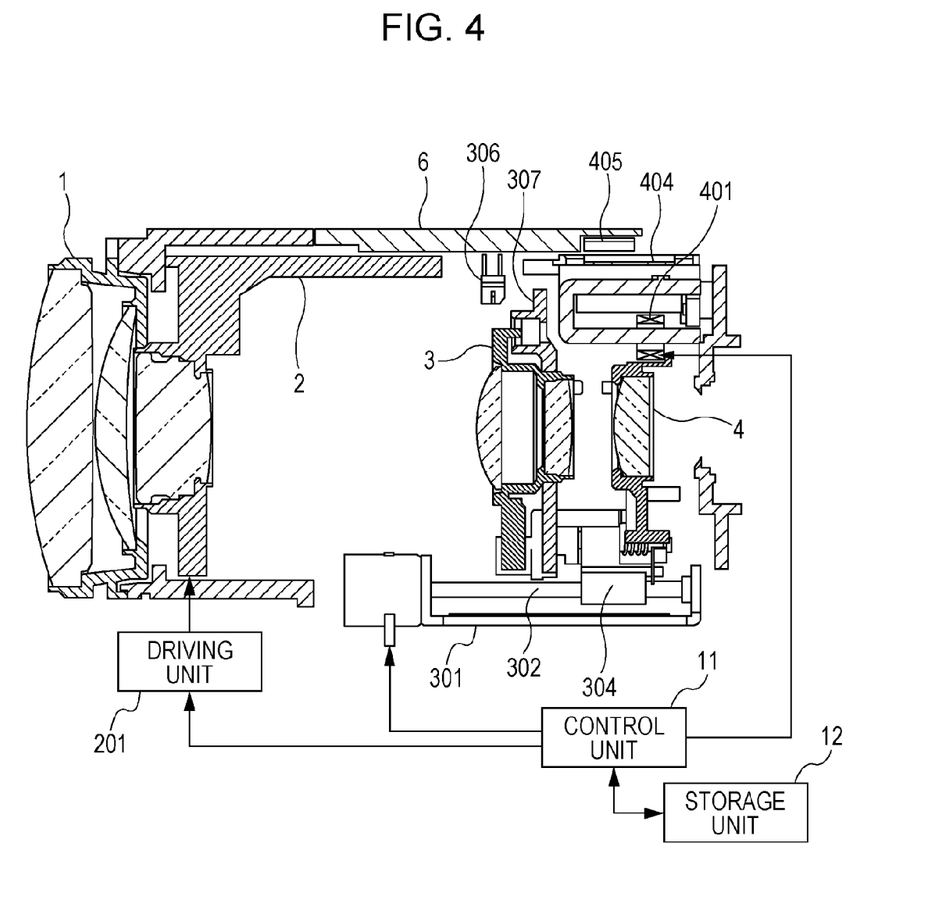
FIG. 4 is a block diagram of the lens barrel of FIG. 2.

Referring to FIG. 4, a control unit 11 outputs control signals to the driving unit (stepper motor) 201, the stepper motor 301, and the driving coil 401 according to signals from the zoom reference position detectors 206 and 306 and the mode of the image pickup apparatus body. The control unit 11 is formed by a microcomputer as an example. A storage unit 12 stores mode information about the control unit 11. In FIG. 4, the driving unit (stepper motor) 201 is the same as the stepper motor 201 illustrated in the other drawings.

The zoom lens system of the embodiment is a wide viewing angle type, such that the focal length of the entire lens system can be shifted more to the wide angle side than in the four-unit zoom lens system of the related art when the size of the lens system is not changed. Compared with the four-unit zoom lens system in which the third lens unit L3 does not move in the optical axis direction, regardless of the focal length, the third lens unit L3 in the zoom lens system of the embodiment moves in the optical axis direction for zooming between a TELE state (telephoto end) and a WIDE state (wide angle end).

The third lens unit L3 is positioned on the imaging plane side in a WIDE state and on the object side in a TELE state. Further, the fourth lens unit L4, which is adjacent to the third lens unit L3 and has a focus function, also moves in the optical axis direction for zooming. When the object moves to the closest side, focusing thereon is performed by moving the fourth lens unit L4 to the object side. When the object moves to the infinity side, focusing thereon is performed by moving the fourth lens unit L4 to the imaging plane side.

Figure 5:
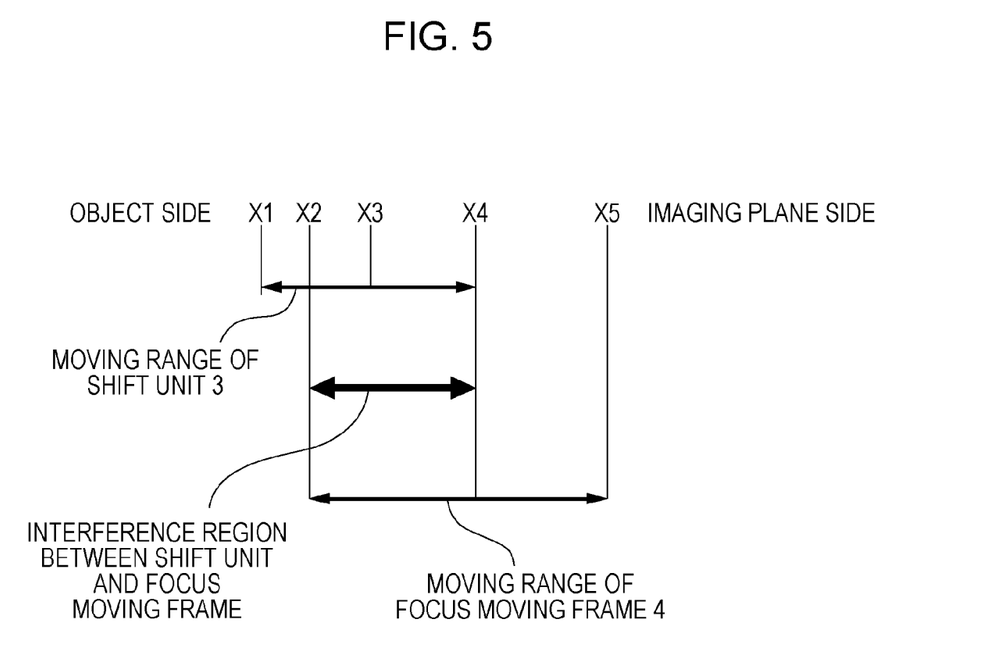
FIG. 5 schematically illustrates moving ranges of a shift unit and a focus moving frame and an interference region therebetween.

FIG. 5 schematically illustrates mechanical moving ranges in the optical axis direction of the shift unit 3 and the focus moving frame 4 and an interference region therebetween in the embodiment. In FIG. 5, a region between positions X1 and X4 represents a moving range of the third lens unit L3. The position X1 indicates a TELE position of the third lens unit L3, and the position X4 indicates a WIDE position of the third lens unit L3. A position X3 indicates a detection position where a light shielding state and a light transmitting state are detected by the above-described zoom reference position detector 306 in order to detect the initial position of the third lens unit L3.

Further, a region between positions X2 and X5 represents a moving range in the optical direction of the fourth lens unit L4. The position X2 indicates a closest position of the fourth lens unit L4, and the position X5 indicates an infinite position of the fourth lens unit L4. As illustrated in the schematic view, there is an overlapping region between the mechanical moving ranges of the third lens unit L3 and the fourth lens unit L4 in the embodiment. The overlapping region extends between the positions X2 and X4.

As described herein, the closest position of the fourth lens unit L4 is the position X2. For this reason, if the fourth lens unit L4 can move to a position closer to the object side than the position X2, it can focus on a closer object. The moving range of the third lens unit L3 (between X1 and X4) is predetermined when the optical specifications are determined. Hence, when the mechanical moving range of the fourth lens unit L4 (between X2 and X5) can overlap more with the moving range of the third lens unit L3, it is possible to focus on a closer object.

Figure 6:
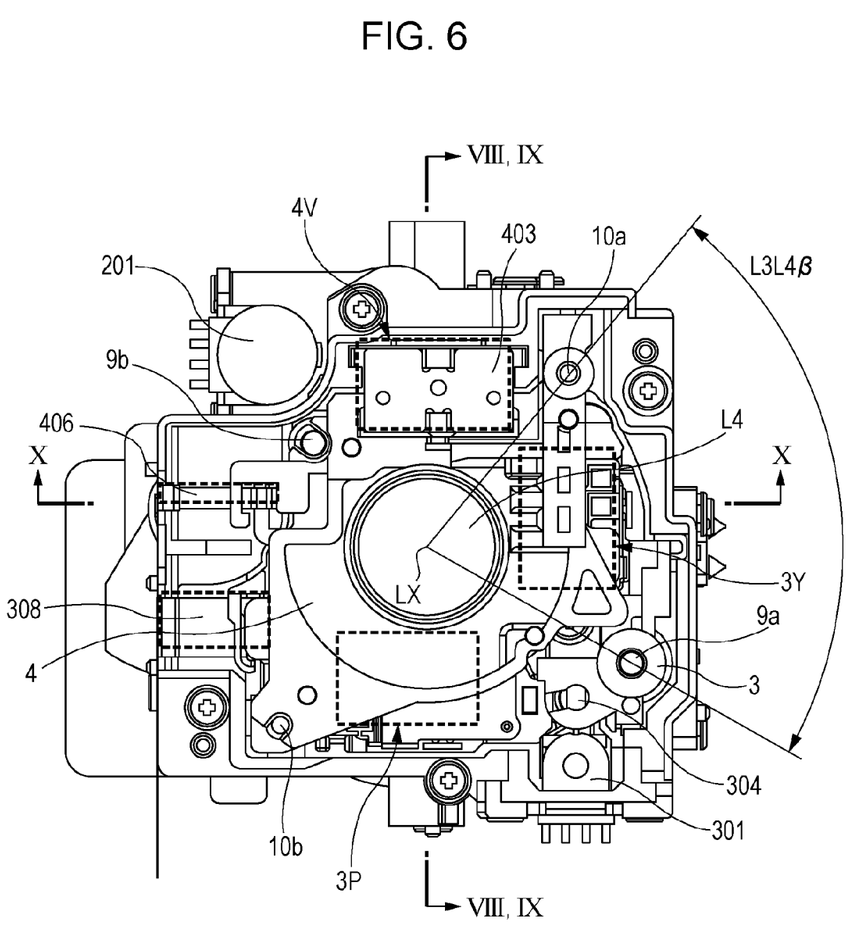
FIG. 6 is a schematic diagram of a lens unit viewed from an imaging plane side, from which a CCD holder is removed.
Figure 7:
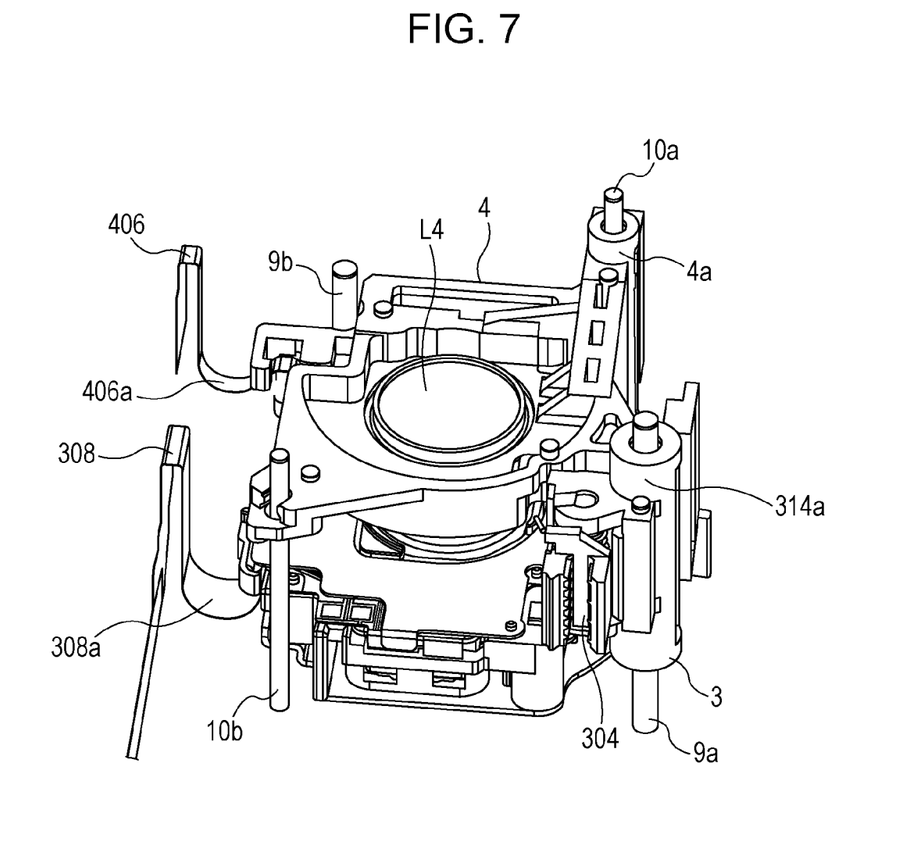
FIG. 7 is an exploded perspective view illustrating a state in which the shift unit and the focus moving frame are fitted on guide bars.

Next, the structures of the shift unit 3 and the focus moving frame 4 whose moving ranges can overlap with each other will be described in detail with reference to FIGS. 5 to 10. FIG. 6 is a diagram of the lens unit viewed from the imaging plane side, in which the CCD holder is not illustrated. FIG. 7 is an exploded perspective view illustrating a state in which the shift unit (second moving frame) 3 and the focus moving frame (first moving frame) 4 are fitted on the guide bars 9a, 9b, 10a, and 10b.

Figure 8:
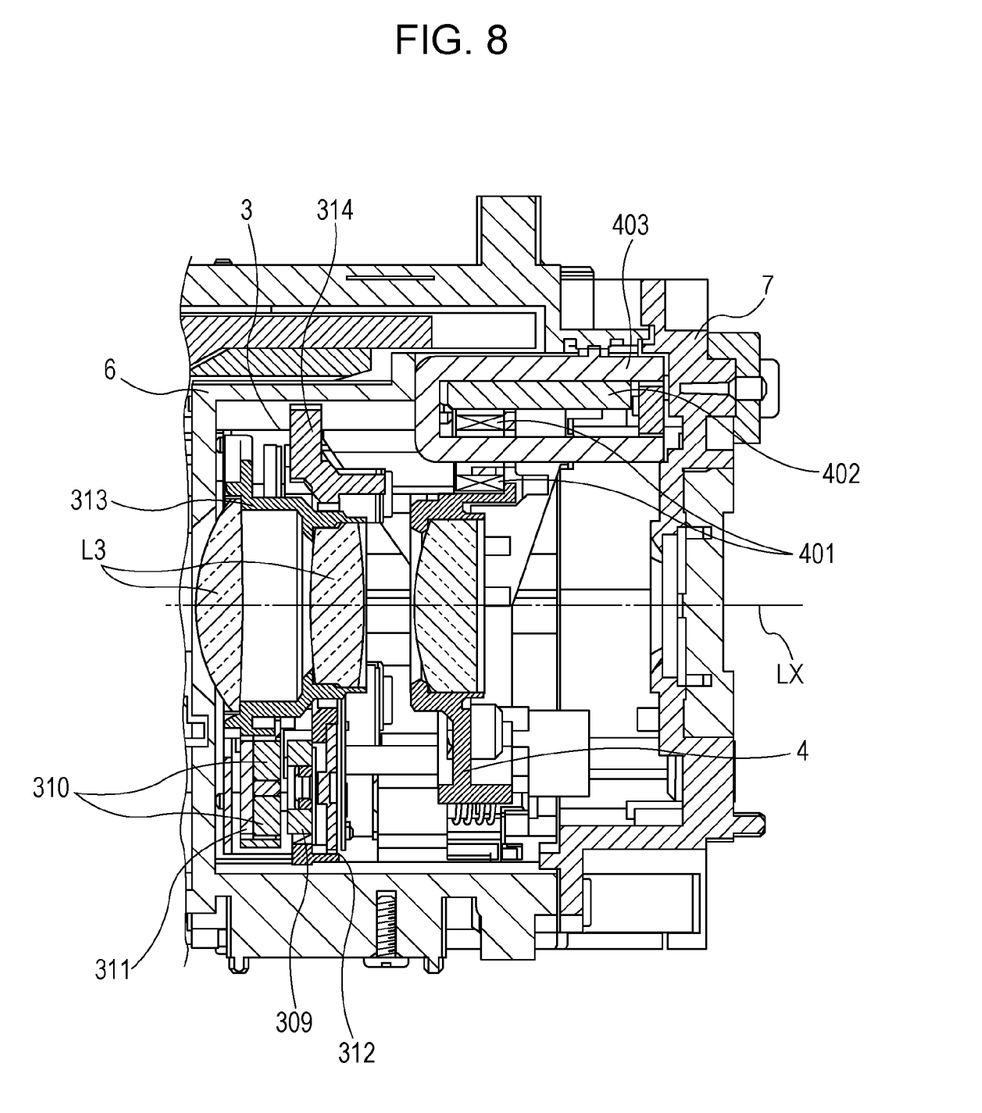
FIG. 8 is a cross-sectional view, taken along line VIII-VIII of FIG. 6, illustrating a state in which a third lens unit and a fourth lens unit are located closest to an object side.
Figure 9:
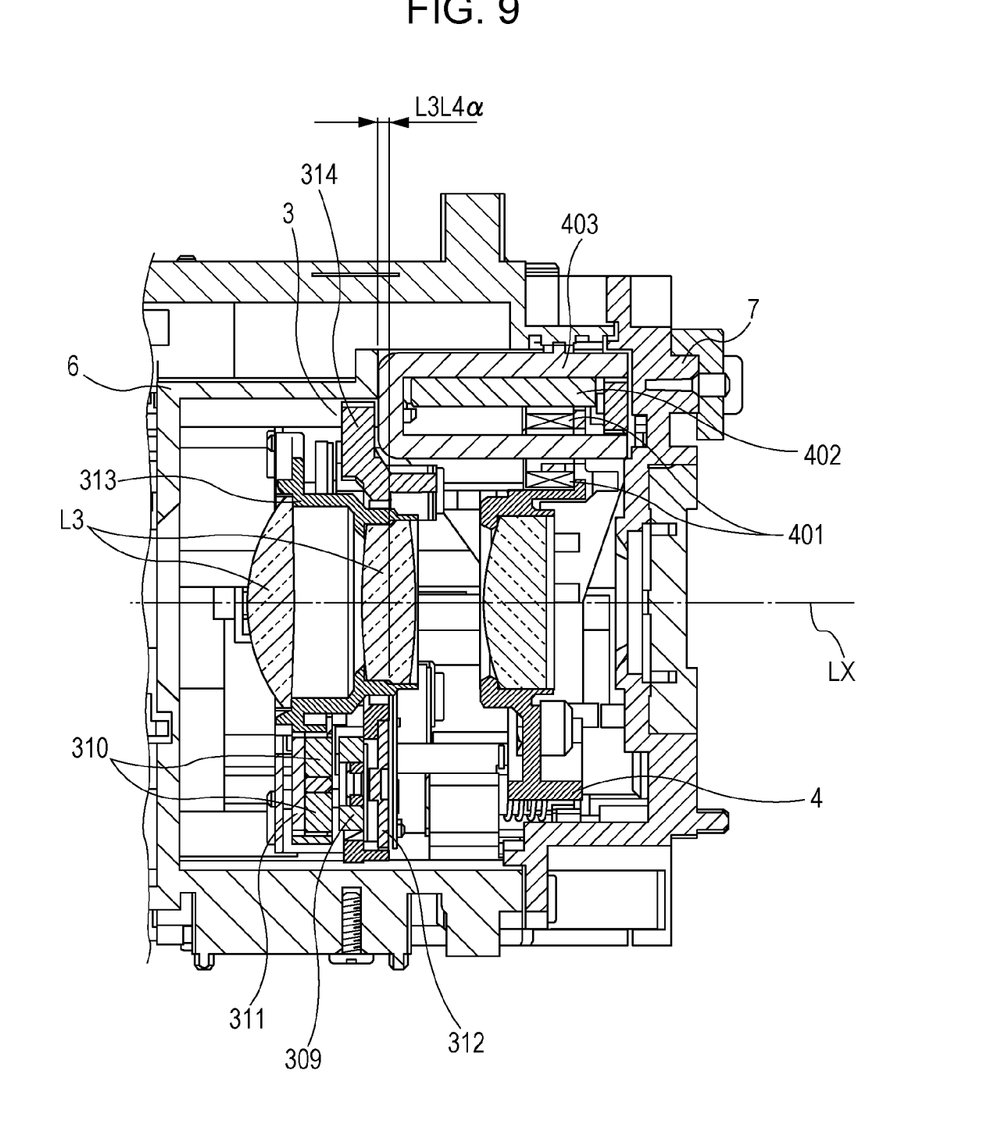
FIG. 9 is a cross-sectional view, taken along line IX-IX of FIG. 6, illustrating a state in which the third lens unit and the fourth lens unit are located closest to the imaging plane side.
Figure 10:
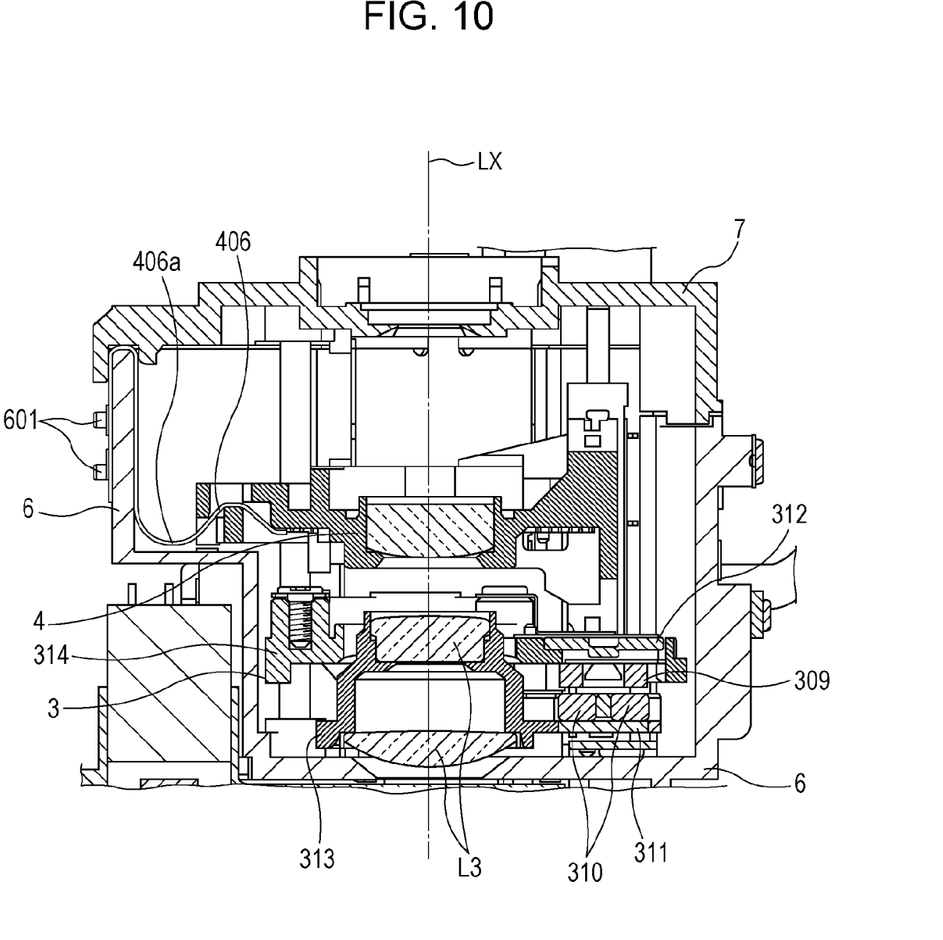
FIG. 10 is a cross-sectional, taken along line X-X of FIG. 6, illustrating a state in which the third lens unit and the fourth lens unit are located closest to the object side.

FIGS. 8 and 9 are sectional views taken along line VIII-VIII and IX-IX of FIG. 6. FIG. 8 illustrates a state in which the third lens unit (second lens) L3 and the fourth lens unit (first lens) L4 are located closest to the object side. FIG. 9 illustrates a state in which the third lens unit L3 and the fourth lens unit L4 are located closest to the imaging plane side. FIG. 10 is a sectional view taken along line X-X of FIG. 6, in which the third lens unit L3 and the fourth lens unit L4 are located closest to the object side.

First, the structure of the shift unit (second moving frame) 3 will be described. As described above, the shift unit 3 can be moved in the optical axis direction by the stepper motor 301. Also, the third lens unit L3 can also be driven in the direction orthogonal to the optical axis. This structure allows correction of a so-called motion blur.

The third lens unit L3 is held or supported by a shift holding frame 313. The shift holding frame 313 includes two magnets (shift magnets) 310 for driving the shift holding frame 313, and first yokes 311 for closing the magnetic paths of the shift magnets 310. A shift base 314 serves as a base member of the shift unit 3, and supports shift coils 309 and second yokes 312 for closing the magnetic paths of the shift magnets 310. When the shift coils 309 are energized, a driving force is generated in the shift magnets 310, so that the third lens unit L3 can move relative to the shift holding frame 313 in the direction orthogonal to the optical axis.

Two sets of the shift magnet 310, the first yoke 311, the second yoke 312, and the shift coil 309 are provided to constitute pitch-direction and yaw-direction shift driving actuator units 3P and 3Y. As illustrated in FIG. 6, the shift driving actuator unit 3P for driving in the pitch direction is provided on the lower side of the optical axis LX, and the shift driving actuator unit 3Y for driving in the yaw direction is provided on the right side of the optical axis LX. Since the two shift driving actuator units are thus provided, the third lens unit L3 can be moved in any direction in a plane perpendicular to the optical axis.

The shift coils 309 provided on the shift base 314 are soldered to a shift flexible printed board (second flexible printed board) 308 in an electrically conductive manner. As illustrated in FIG. 7, the shift flexible printed board 308 is fixed to a retaining portion provided on the rear barrel 6, and is connected to the shift unit 3 by a U-turn portion 308a provided in the barrel. The U-turn portion 308a is U-shaped so that reactive force of the flexible printed board is not applied to the shift unit 3 when the shift unit 3 moves in the optical axis direction.

Next, the structure of the focus moving frame (first moving frame) 4 will be described. As described herein, the focus moving frame 4 can be moved in the optical axis direction by the voice coil motor (first driving unit) 401 to 403. The driving coil 401 is soldered to a focus flexible printed board (first flexible printed board) 406 in an electrically conductive manner. The focus flexible printed board 406 is fixed to focus-flexible-printed-board retaining portions 601 provided on the rear barrel 6. Further, the focus flexible printed board 406 is connected to the driving coil 401 fixed to the focus moving frame 4 by a U-turn portion 406a provided in a U-shape in the barrel.

Referring to FIG. 6, a description will be given again of the positional relationship around the optical axis direction among the shift flexible printed board 308, the focus flexible printed board 406, the yaw-direction shift driving actuator unit 3Y, the pitch-direction shift driving actuator unit 3P, and the voice coil motor (focus-moving-frame driving unit) 4V. These components are shown by dotted lines in FIG. 6 in order to specify the sizes thereof.

In the embodiment, the U-turn portion 308a of the shift flexible printed board 308 and the U-turn portion 406a of the focus flexible printed board 406 are arranged as follows. That is, when the lens unit is viewed in the optical axis direction, the U-turn portion 308a and the U-turn portion 406a are located on a side of the optical axis LX opposite the yaw-direction shift driving actuator unit 3Y. Further, the voice coil motor (focus-moving-frame driving unit) 4V for driving the focus moving frame 4 is arranged as follows. That is, when the lens unit is viewed in the optical axis direction, the voice coil motor 4V is located on a side of the optical axis LX opposite the pitch-direction shift driving actuator unit 3P.

These arrangements allow the actuator units 3Y and 3P and the flexible printed boards 308 and 406 to be optimally arranged around the optical axis LX. Accordingly, the mechanical moving range in the optical axis direction of the fourth lens unit L4 can overlap more with that of the third lens unit L3 without increasing the radial size of the lens unit.

Particularly when the shift unit 3 is moved to a position closest to the imaging plane side (position X4), the pitch-direction shift driving actuator unit 3P (309, 310, 311, and 312) overlaps with the focus-moving-frame driving voice coil motor 4V in the plane orthogonal to the optical axis. The overlapping amount is shown by L3L4α in FIG. 9. That is, as illustrated in FIG. 6, the shift unit 3 can be moved more toward the focus moving frame 4 by placing the voice coil motor (one driving unit) 4V and the pitch-direction shift driving actuator unit (one correction driving source) 3P on opposite sides of the optical axis LX.

Thus, the focus moving frame 4 can be moved more toward the shift unit 3, so that the overlapping amount can increase. In the embodiment, since the TELE (telephoto end) position and WIDE (wide angle end) position of the shift unit 3 are determined by optical design, the focus moving frame 4 can be moved more toward the shift unit 3. In this case, the focus moving frame 4 can move more to the closest side (object side) for focusing, and therefore, it is possible to focus on a closer object.

The guide bar 9a is provided at a sleeve 314a of the shift base 314 so as to position the shift base 314. The guide bar 10a is provided at a sleeve 4a of the focus moving frame 4 so as to position the focus moving frame 4. As the angle around the optical axis between the guide bar 9a and the guide bar 10a increases, the overlapping amount between the shift unit 3 and the focus moving frame 4 increases.

In FIG. 6, preferably, an angle L3L4β formed between a line connecting the optical axis LX and the guide bar 9a and a line connecting the optical axis LX and the guide bar 10a is at least 60 degrees or more, more preferably, within the range of about 60 to about 180 degrees. This increases the overlapping amount and allows focusing on a closer object, as described above.

As described above, according to the embodiment, it is possible to obtain a lens barrel having a reduced size, and an optical apparatus using the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193706 filed Aug. 31, 2010, which is hereby incorporated by reference herein in its entirety.

What is claimed is:

1. A lens barrel comprising:
a first moving frame configured to move along a first guide bar in an optical axis direction while supporting a first lens;
a second moving frame configured to move along a second guide bar in the optical axis direction while supporting a second lens and to move in a direction perpendicular to an optical axis so as to correct a motion blur, the second lens being provided adjacent to the first lens and supported by a fixed barrel;
a first driving unit configured to move the first moving frame in the optical axis direction;
a second driving unit configured to move the second moving frame in the optical axis direction; and
two correction driving sources configured to move the second driving unit in a direction perpendicular to the optical axis,
wherein the first moving frame and the second moving frame move independently,
wherein moving ranges in the optical axis direction of the first moving frame and the second moving frame overlap with each other,
wherein the first moving frame is connected to a fixing portion of the fixed barrel by a first flexible printed board, and the second moving frame is connected to the fixing portion of the fixed barrel by a second flexible printed board,
wherein one of the first driving unit and the second driving unit is located on a side of the optical axis opposite one of the two correction driving sources when viewed in the optical axis direction, and
wherein a U-turn portion of the first flexible printed board and a U-turn portion of the second flexible printed board are located on a side of the optical axis opposite the other correction driving source when viewed in the optical axis direction.

2. The lens barrel according to claim 1, wherein a smaller angle of an angle formed by a line connecting the optical axis and a center of the first guide bar and an angle formed by a line connecting the optical axis and a center of the second guide bar is at least 60 degrees or more, when viewed in the optical axis direction.

3. An optical apparatus comprising the lens barrel according to claim 1.

* * * * *